STEPHEN ZECHMEISTER
INVENTOR

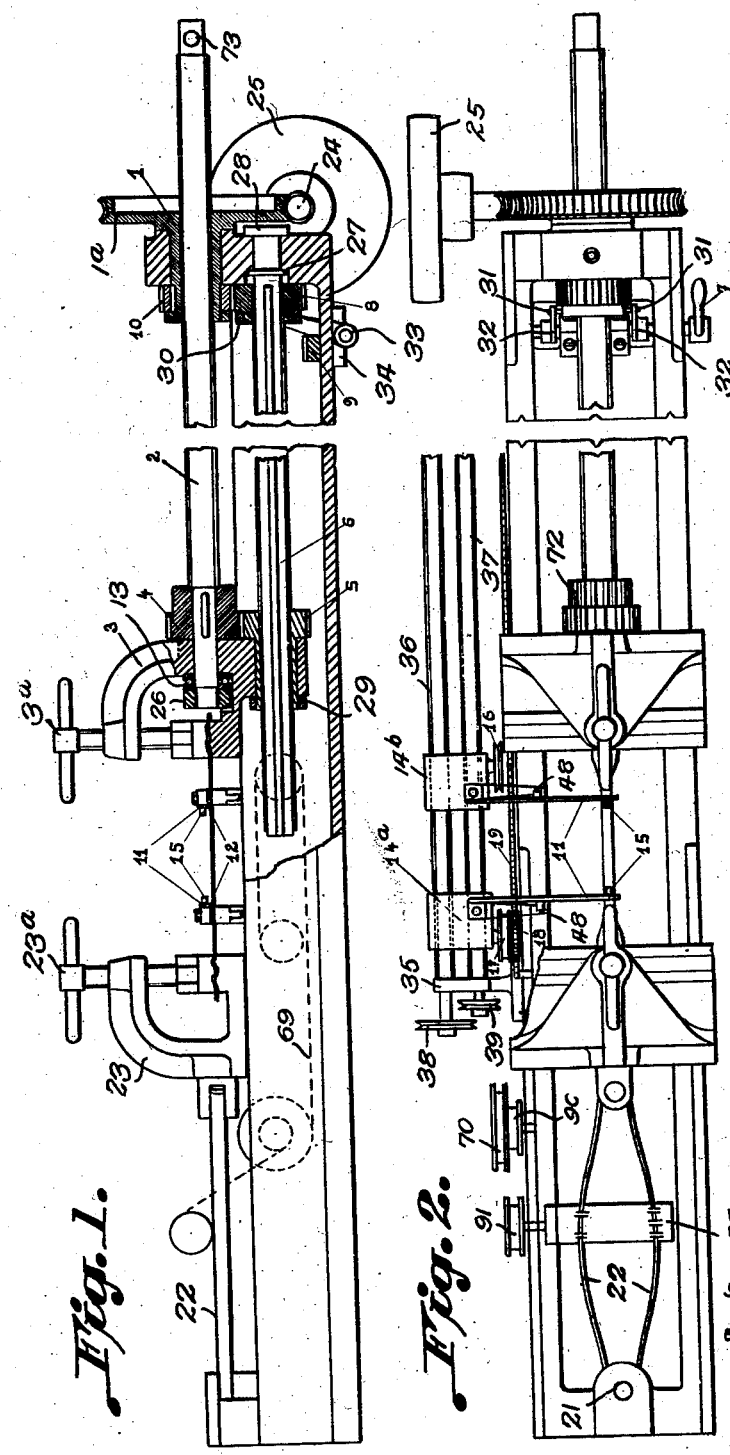

BY Mack & Blum
ATTORNEYS

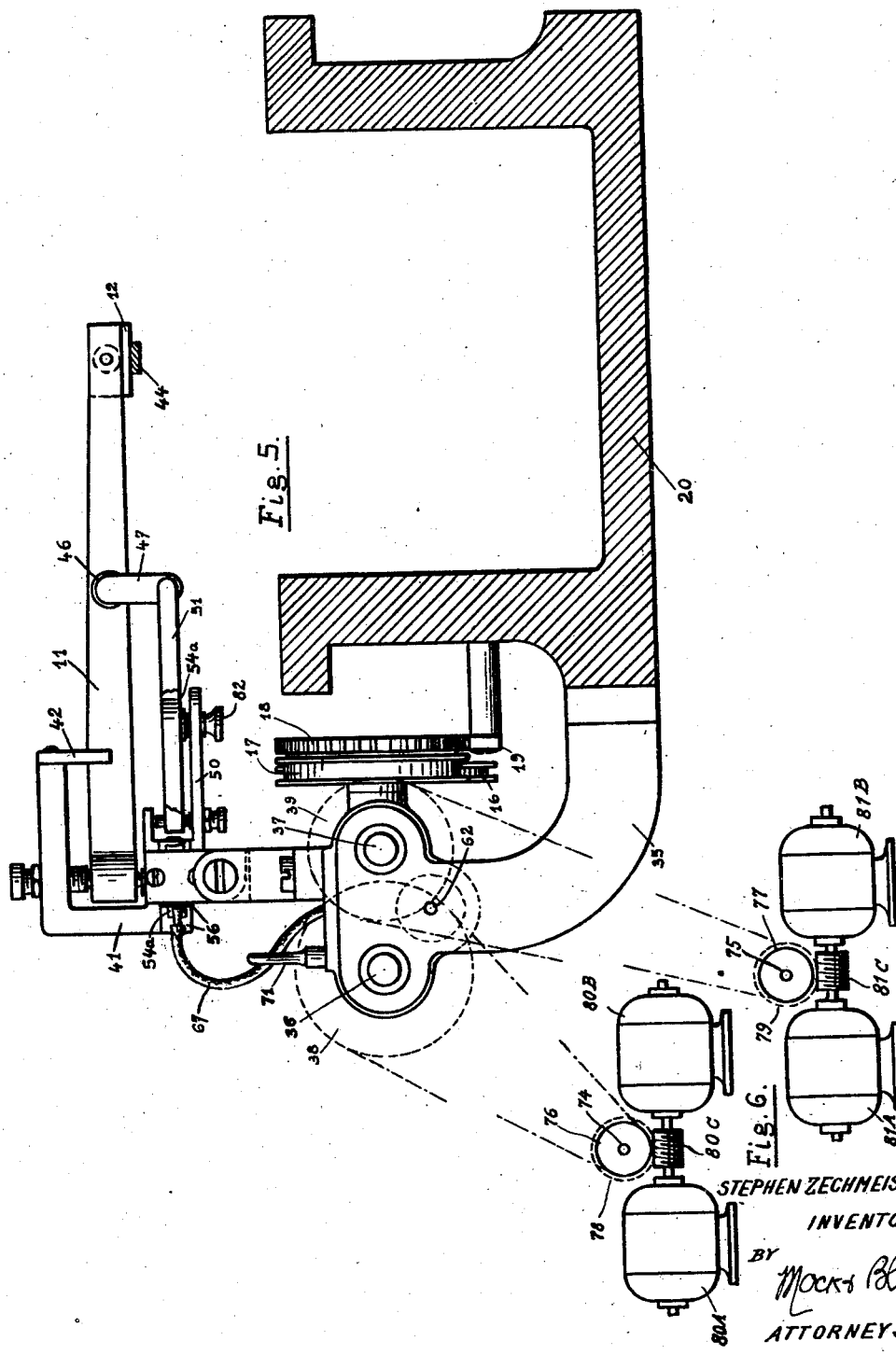

Patented Dec. 22, 1936

2,065,359

UNITED STATES PATENT OFFICE 2,065,359

TESTING MACHINE FOR TENSILE TESTS

Stephen Zechmeister, Budapest, Hungary

Application May 23, 1933, Serial No. 672,384
In Hungary December 15, 1932

14 Claims. (Cl. 265—12)

This invention relates to new and useful improvements in tearing and testing machines and in particular is concerned with a device adapted to automatically and exactly record the tensional strain on a specimen of rubber material.

It is among the objects of my invention to provide a simple and inexpensive mechanism for changing within wide limits the speed at which different materials, like textile fabrics, paper, rubber and so forth may be tested with suitable velocities by means of the same machine.

Machines with variable velocities for tearing or stretching have been devised before. They are, however, complicated and are provided with gears having a high number of revolutions per minute. This is a drawback, as they are expensive to manufacture and furthermore, on account of the high circumferential speed of their gearing are noisy in operation. Considering that such testing machines are often employed in business offices this feature is of course objectionable.

A further object of my invention therefore is to provide a testing machine which is simple in construction and as noiseless as possible in operation, i. e. the circumferential speed of spurwheels or the like should be low.

A further object of my invention is to provide a testing apparatus adapted to automatically measure the tensional strain of a rubber strip selected so that its width is the same throughout its length. If this precaution were not observed, the results obtained would be faulty.

Another object of my invention is to provide a testing and recording apparatus, in which the force necessary to actuate the recording means is not derived from the specimen undergoing the strain of testing, but is coming from an independent source, i. e. little auxiliary motors, so-called "servomotors", adapted to set said recording means into motion.

A further corollary object is to provide an apparatus of the aforesaid description, in which the only force of insignificant amount, derived from the specimen to be tested, is what is required to switch on the working current in said "servomotors".

Testing machines have been invented, in which a selected sample of the rubber band is examined. But in these machines it is necessary to apply marks or signs to both ends of the band portion under examination and to attach the recording mechanism closely to these marks. But the manual application of these marks, as may be seen from the U. S. Patent No. 1,846,241, page 3, line 74, and the observation of the same during testing requires time and labor, and furthermore the attachments of the respective elements of the recording mechanism to the rubber band and the incidental transmission of the energy required for actuating the recording mechanism from the same band cause injurious deformation of the rubber material. Consequently the results, recorded by such machines are unreliable. After all, the recording by such machines is not done automatically inasmuch as a visual inspection of the marks together with an eventual readjustment of the elements attached to them is indispensable. The two objects, last listed, therefore do away with all these drawbacks.

A further object of this invention, concurrent with the last named, is to provide a recording mechanism which can dispense with the manual application of any marks indicating the limits of the band portion to be examined, the arrangement being such that the limitation and the recording of the limit points on said portion is accomplished automatically.

Other objects will appear from a more detailed description of an embodiment of the inventive principles, as illustrated by the accompanying drawings in which—

Figure 1 is a view in side elevation, partly sectional and fragmentary, of one embodiment of the inventive concept, representing a testing and tearing machine, horizontally arranged, and provided with a stress-measuring spring device.

Figure 2 is a top view, of the same machine.

Figure 5 is a large scale cross section through the main frame of the machine and showing the tension recording device in full side view.

Figure 6 shows the small motors, employed for actuating said device, more or less diagrammatically. By their location these motors also approximately indicate their operative relation to the recording device.

Similar characters denote similar parts throughout the different views.

Figure 3:
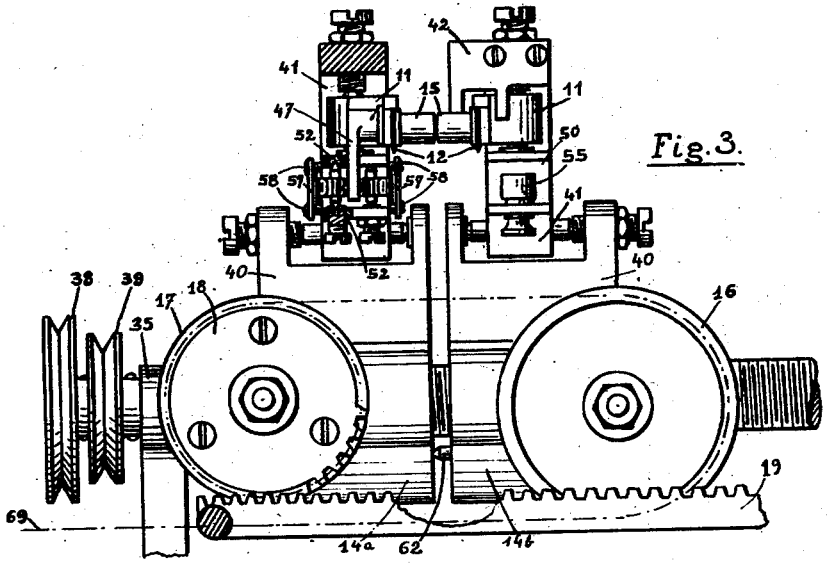
Figure 3 is a front elevation, partly sectional, showing the two carriages of the tension or elongation recording device, diagrammatically indicated in Figure 2, and omitted in Figure 1, more in detail and at a larger scale.

But it is to be understood that other embodiments of the inventive concept are possible without deviating from the leading principles of the same, and the views shown therefore are to be taken merely as illustrative and not as restrictive, while the scope of the invention should be judged not from the details shown, but from the claims attached at the end.

Referring more in detail to the different views, the casting 20, whose channel-shaped cross section is shown in Figure 5, and which substantially forms an open trough, closed at both ends, represents the main frame of the testing machine. At the left end is pivotally jointed at 21 the strain-measuring device 22, consisting of two bow-shaped flat springs facing each other with their concave sides and fixedly jointed at their extreme ends, while at the right end of the frame are provided the superimposed bearings for the non-slidably journalled nut 1 and shaft 6.

The two lateral upper flanges of the frame casting form the rails for the two carriages 23 and 3 between which the testing specimen is clamped. Carriage 23 is tied to the measuring spring 22. Carriage 3 is provided with two vertically superimposed bearings, the upper one for the spindle 2, the lower one for shaft 6, which is either ribbed or fluted, so that any sleeves or wheels, mounted thereon, cannot rotate independently from the shaft. The front end of spindle 2 is rotatably journalled in the carriage bearing but cannot move in an axial direction independently from the carriage. The spindle portion protruding from the bearing toward the intermediate space between the carriages is journalled on a ball bearing 13 which is partly seated in the carriage frame, so as to form a thrust bearing to transfer the tensional pull of the spindle backwards to the carriage, while the extreme end bears a nut 26, fixedly locked in place by a pin or some other suitable means. On the other side of the carriage bearing and closely facing the carriage body by an annular finishing spot, the spur gear 4 is keyed to the spindle 2. It is to be observed, that in order to lessen the friction, the bore through the carriage should provide a slight circumferential clearance to the spindle 2. Obviously then the spindle, moving back or forth in a longitudinal direction, takes the carriage along with it, while rotating freely within the carriage bearing. Only that length of the spindle, extant backwardly from the hub of the spur gear 4 is threaded, as indicated, at a suitable pitch, preferredly with a square thread. The extreme free end, which can be smooth again, is provided with a diametral hole 73, into which a pin or spanner may be inserted for rotating the spindle manually when the testing sample is to be clamped in place.

The fixedly journalled nut 1 through which the spindle 2 is threaded is cast integral with the wormwheel 1a which is driven by a motor, not shown, through a transmission device comprising the stepped wheel 25 and the worm 24. The ribbed or fluted shaft 6 has a smooth end which is rotatably journalled in the closed end of the frame casting 20, but by means of the annular flange 27 and the fixedly attached head or nut 28 is guarded against longitudinal shifting. The spur gear 10, keyed on the prolonged neck of the spindle nut 1 and the similar gear 8, slidably seated on the shaft 6, can actuate the spindle and the underlying shaft 6 when they are in mesh. Shaft 6 passes through the spur gear 5 which similarly as the nut 1 is rotatably but non-slidably journalled in the carriage body 3. This gear engages the spur gear 4, and its hub which passes like a bushing through the carriage bearing, carries on its free end the fixedly secured nut 29 whereby any displacement of the spur gear 5, independent from the carriage, is prevented.

As the hub of the gear is provided with grooves into which the ribs of shaft 6 fit, the gear 5 is apparently capable of two simultaneous movements: it may rotate, turning gear 4 and shaft 2 at the same time, and may also travel along the shaft 6, if pushed along by the carriage 3.

The spur gear 8, like gear 5, is provided with grooves through which the ribs of the shaft 6 can slide and it carries on a hublike offset the free-running ring 30 which is provided at opposite points with two trunnions 31 fitted into slots of the lever arms 32. These arms are keyed in parallel relation to each other upon the short shaft 33. The latter is arranged underneath frame 20, at right angles to shaft 6, and rotatably journalled within the bearings 34. At the free end protruding at the front of the machine it carries a hand lever 7. Bearings 34 are supported by the frame 20 as are also the bearings for the worm shaft 24, running parallel to shaft 33. These bearings are not shown in the drawings. Across the bottom of the troughlike frame 20 is provided the short tooth rack 9 which is cut to the same pitch as spur gears 8 and 10.

It will be apparent now that if the hand-lever 7 is thrown over to the left, the spur gear 8 is thereby disengaged from its mate 10 and is fixedly held in place by the teeth of the unmovable rack 9. Consequently shaft 6 together with gears 8, 5 and 4 are held immovably against rotation, and if now the wormwheel 1a, integral with the internally threaded nut 1 is rotated by the worm drive, the spindle 2 is drawn backward or forward without rotating, in accordance with its pitch through the nut 1, carrying carriage 3 with it. The gears 4 and 5, without rotation, travel along shaft 6; spur gear 10 of course will rotate, but as it is disengaged from gear 8, it will run idle.

But if the hand lever 7 is thrown over to the right, as shown in the drawings, gear 8 is removed from the rack and is meshed into gear 10. Thereby gear 8, ribbed shaft 6, gears 5 and 4 and consequently also spindle 2 is rotated, the latter running in the same direction as the nut 1. The speed ratio at which the spindle will be drawn inwardly or outwardly will then depend upon the ratio of the R. P. M. of the nut to that of the spindle.

If however, the handle 7 is pushed into a middle, that is, an upright position, gear 8 neither engages gear 10, nor rack 9, so that spindle 2 can now be turned by hand in either direction, whereby an exact manual adjustment of the carriage 3 and proper fastening of the specimen in the clamps is made possible. To avoid manual handling of the oily spindle or the teeth of the wheel 4, the latter is provided with a hub 72, having a knurled surface.

On the rear side of the main frame 20 is provided a bracket 35 with bearings for the threaded spindles 36 and 37 (see Figures 2 and 5). The other ends of these spindles are journalled in a similar bracket, not especially shown. The spindles carry the grooved sheaves 38 and 39 respectively and are driven separately from motor-actuated countershafts 74 and 75, as is diagrammatically indicated in Figure 6. Aside from two sheaves 76 and 77 which are keyed onto the shafts 74 and 75 respectively to transmit the driving power by means of round belts or cords, each of the shafts carries also a wormwheel 78, respectively 79; the wormwheel 78 engages a worm 80C and the wormwheel 79 engages a worm 81C. Each of these worms is mounted on a shaft which is common to two small reversible twin motors, so-called "servo-motors", 80A, 80B and 81A, 81B respectively.

Figure 4:
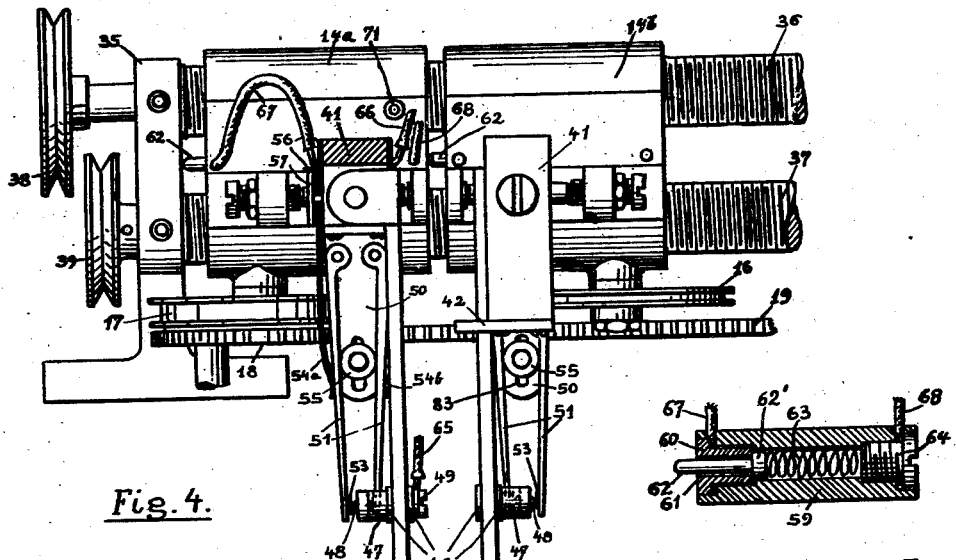
Figure 4 is a top view of the recording device, with one of the forked guides for the contact arms indicated in section only.

On the two spindles are mounted the two carriages 14a and 14b in such a way that carriage or movable support 14a has a smooth free-running bore for spindle 37 and is threaded for spindle 36, while carriage 14b is threaded for spindle 37 while smoothly bored for spindle 36. Each spindle therefore moves its own carriage. Carriage 14a carries the cord sheave 17, coupled to the spur gear 18 which runs on the rack 19, the latter being supported in suitable manner by the frame 20, while carriage 14b carries the cord sheave 16. See Figures 3, 4 and 5. The various implements carried by the upper parts of the carriages are symmetrically formed in relation to those on the other carriage and are designated herewith the same numerals. Some of these parts, for the sake of clearer understanding, are not shown on both carriages, but are nevertheless to be assumed as being alike.

In the forked bearings 40 the brackets 41 are pivotally supported on conical points. In these brackets 41 the arms or contacting elements 11 are also pivotally supported, so that they may be swung sideways with very little friction, their lateral movements being limited by the forked members 42. The combination of either bracket 41 with an arm 11, pivotally supported, forms a universal link. The arms 11 carry on their free ends the downwardly projecting blades 12, which touch the specimen 44, and the buffers 15 which are bolted into the arms 11 and also serve to clamp the blades to the arms by means of the plates 45. Furthermore the arms carry on their sides the contact members 47, which are bolted to them, yet electrically insulated from them by the non-conducting washers 46, and are at their dependent ends provided with platinum contact points 48. Current is conducted to them by cables 65, attached by screws 49. The brackets 41 are furthermore provided with the forked bearing brackets 50, separate pieces, bolted or screwed onto the main brackets 41. In these brackets 50 are pivotally suspended, on vertically arranged agate needles 52, whereby they also are insulated, the contact levers 51. These levers carry at their free ends the platinum patches 53 and are held in their normal position by the weak springs 54a and 54b on the outsides and by the separator 55 on the inside. The springs 54a and 54b are insulatingly attached to the brackets 41 by means of plates 57, screws 58 and insulator plates 56. The separator 55 is a roller, also made of insulating material and supported on bracket 50 by its threaded shaft which is adjustably held in a slot 83 of the bracket 50 by a knurled clamping nut 82. (See Figures 5 and 4).

Figure 7:
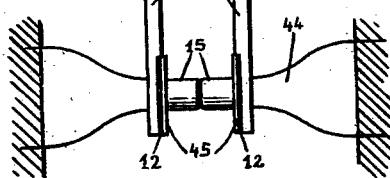
Figure 7 shows the arrangement of a circuit breaker, such as is provided within each carriage of the recording device.

In each carriage is provided an electrical circuit breaker, shown in detail in Figure 7. It comprises the following parts: a cylindrical non-conductive casing 59, a metal bushing 60 at one end and a screw 64 at the other, each forming the terminals of the leads 67 and 68 respectively; in the bushing 60 is slidably supported the metal pin 62, though insulated from the bushing by the non-conductive sleeve 61. The switch contact for the circuit is made by the head 62' of the pin touching the rear end of the bushing 60, resiliently pressed against it by the metal coil spring 63 which also forms a part of the circuit. If pin 62 is pushed inwardly against the tension of spring 63, the circuit is broken. From the foregoing it appears that the pin 62 interrupts only the circuit of one of the pair of servo-motors, which circuit includes one of the two servo-motors, cable 65, contact member 47, left hand lever 51, spring 54a, lead 67, pin 61, spring 63 and lead 68. The other circuit, however, which includes the other servo-motor, cable 65, contact member 47, right hand lever 51, spring 54b and lead 66 does not go through the circuit-breaker and will not be interrupted by movement of the pin 62.

I shall now describe the working method of the machine and in connection therewith a few more detail features which so far have been omitted.

The specimen or sample of any material to be tested is first stretched securely and without tension between the clamping jaws of the two carriages 3 and 23. A detail description of them has been dispensed with, as the construction is well known and no novel feature in relation to them is claimed by me. The clamping screws 23a and 3a respectively represent the fastening means, or any other adequate fastening means in accordance with the nature of the sample may be substituted for it, either alone or in conjunction with the screws 23a, 3a.

If it is now desired to tear the sample apart at a proportionally high operating velocity, as for instance might be desirable in the case of rubber ribbons, the handlever 7 is thrown over to the left and the spindle 2, with the lower shaft 6 at a standstill, as explained before, is drawn outwardly together with carriage 3a. The transmission ratio between wormwheel, worm and pitch of spindle is calculated so that if the driving motor has for example 800 R. P. M. and the smaller diameter of the stepped wheel 25 is used, a tearing velocity of 500 mm. per minute is realized (the customary speed in testing rubber bands). If however, the motor power is transmitted by means of the larger diameter, the tearing velocity may amount for instance to 100 mm. per minute.

If however, it is required to still more decrease the tearing velocity, the handlever 7 is thrown over to the right, as shown. The gear ratios are calculated so that in that case the two optional former velocities are reduced to one tenth of their directly operative value, i. e., using the smaller diameter of the stepped wheel a tearing velocity of 50 mm. per min., and with the larger diameter, 10 mm. per minute will be realized, as will be understood from the former explanations.

The gears 10 and 8 have the same number of teeth and the ratio of the number of teeth between gears 4 and 5 is preferably such that, if the spindle 2 for example makes 9 revolutions, the nut 10 revolves 10 times. Through a combination of the step-wheel transmission with the ribbed-shaft construction therefore I obtain four different tearing velocities, i. e. 500, 100, 50 and 10 mm. per minute in a very simple way.

But the utilization of a fluted or ribbed shaft represents only one embodiment of my inventive concept, and it is to be understood, that other constructive alterations may be made without departing from the spirit and scope of the invention.

If the material to be tested is such that the elongation of the whole sample—between the carriage clamps—is to be measured, a thread is fastened to carriage clamps 3 and wound (for example with a little weight attached to its end) over the cylinder 84, rotatably arranged over the strain measuring spring 22. (See Figures 1 and 2.) This thread will cause rotation of the cylinder over which the recording blank paper is wound and fastened. The deformation of the spring by the pull exerted upon the sample will be described upon this paper by means of a suitable lever system and a scribing stylus, but as that device is well known and not part of my invention, a detail description or illustration of the same may be dispensed with.

If the elongation of only a selected portion of the sample is to be measured, as it may be absolutely necessary, especially when testing strips of rubber, my machine can be used as elongation-meter to the greatest possible advantage. For such testing the sample should have an original standard form—resembling the shape of a dumb-bell, i. e. with gradual enlargements at the ends, as shown by 44, Figure 4. The method of testing is as follows:—

After the sample is clamped tight between the carriages, the driving belt is placed over the smaller circumference of the stepped wheel and the hand lever 7 is thrown over to the left. Then the two arms 11 which always after the last test have been left standing in upright position, are swung down, so that the blades 12 rest on the rubber strip and the buffers 15 contact each other. (See Figure 4.) As the blades 12 thus touch the rubber strip at a predetermined distance from each other—which of course depends upon the length of the buffers (as they are chosen or determined prior to the test) and during the test these blades remain on the same spots, or move along with them respectively, the porton of the rubber strip to be tested is exactly determined, without the necessity of making marks upon the sample.

If the driving motor and therewith the stretching device is set in operation, the rubber strip will be elongated in the direction of the arrow (Figure 4) and starts to take the blades along with it. What happens now, is this: the arms 11 swing from their rectangular position a trifle to the right, thereby the platinum contacts 48 and 53 on the right arm touch each other, the circuits of the servo-motors are closed, the spindles 36 and 37 begin to rotate and the carriages 14a and 14b travel towards the right. The path of the electrical current goes from the platinum contact through the right-hand contact lever 51, spring 54b (not shown) and cables 65 and 66 to the servo-motors. These motors, as indicated in Figure 6, are so arranged, that each of the carriages 14a and 14b is driven by two motors, coupled unto a common shaft which carries a worm, actuating a superimposed wormwheel in whatever direction the motors may be driven. From the shafts 74, 75 of these wheels the parallel spindles 36, 37, are actuated in the manner described before. Each pair of motors, moving a carriage reciprocatingly, is wired by well known means in such a way that one of the motors drives the carriage to the right when the righthanded platinum contacts 48 and 53 touch each other, and the other motor drives the carriage to the left, when the lefthanded contacts connect, the current changing its path as soon as the righthand contacts disconnect and the lefthand conduit gets into action.

When the carriage travels to the left the current passes through the platinum contacts 48, 53 on the left arm, the lever 51, spring 54a, cables 67, 68 and the circuit breaker in the lower part of the carriage.

When the arms 11 happen to reach a middle, i. e. normal or rectangular position, so that both pairs of contacts, on the right side as well as on the left, make connection and consequently, both motors (tending to run in opposite directions) receive current, then apparently no movement can result, as both motors buck each other, and if one motor priorly should have been running, it is quickly braked and brought to a standstill by the other. The insulating roller or separator, being adjustable within its slot, can be used to bring the distance between the contact points to any desired degree of fineness and sensitiveness. As the contact levers 51 are slightly converging toward each other, the distance between the outer contact points is increased or decreased by any movement of the separator roller within the slot. If after arresting the motors, the specimen is further elongated, it promptly takes along the blades and sets the carriages in motion again. The mechanism responds instantly to any such impulses. This principle of twin motors, actuating the same drive in opposite senses however, and their reversion by contact switches I do not claim as an original invention but only in combination with other features.

As the carriages in their movements exactly duplicate the displacements of the ends of the section of the sample portion under test, this displacement can be exactly measured by recording the relative motion of the carriages. This therefore will indicate the true elongation of the sample under stress.

For this purpose the thread 69 (see Figures 1 and 3) is fastened to the circumference of roller 17, by being wound several times around it, then carried over roller 16 and finally fastened to sheave 70. From a smaller sheave 90, coupled to sheave 70 a cord or thread drive communicates the movement at a reduced ratio to the sheave 91 on the shaft of the aforementioned recording cylinder 84 (Figure 2) where the displacement may be registered by well known means. If both carriages were moving in unison, the recording cylinder would not rotate and could not register any alongation, as by means of the gear 18, moving on the rack 19, just as much thread would be released as would be taken up by the travel of the carriages, advancing at the same velocity. If the distance between the travelling carriages however increases, the thread is hauled in and is lengthened by double the amount of the relative separation of the carriages from each other. This movement of the thread is recorded at a suitably reduced ratio on the cylinder 84 as before explained.

After the sample has been torn, the arms 11 are tilted by hand into a vertical position and the carriages are automatically returned by the servomotors into their initial positions. The impulse for this reverse activation given to the motors, is due to the fact that both arms 11, when tilted into vertical position, assume a slight inclination towards the left side and thereby bring the left contact points 53, 48 into touch, keeping the right ones apart. The arm of carriage 14b naturally tilts toward the left as its center of gravity, when projected, would fall inwardly of the pivotal axis, around which the arm can oscillate, and the arm of carriage 14a is tilted over by the little peg 71 (see Figures 4 and 5) provided on the carriage, on which the pivotal end of the arm comes to rest. As soon as carriage 14a has come back far enough that pin 62 of the circuit breaker strikes bracket 35 and is driven inward, the circuit for the electromotor returning this carriage into its initial position is broken and said carriage 14a comes to rest. Similarly carriage 14b is stopped when the pin of its circuit breaker strikes the first carriage.

Then the apparatus is in ready position for the next test, inasmuch as the circuit 65, 47, right hand lever 51, 54b, 66 is unbroken. As soon as the carriage moves to the right during the next test, the spring 63 returns the pin 62 for closing the circuit 65, 47, left hand lever 51, 54a, 67, 62, 63, 68.

This tension-measuring apparatus is also well adapted for recording hysteresis curves, as the blades 12 together with the carriages 14a and 14b will follow and register the movements of the rubber strip they touch just as closely when it contracts again as when it expands and the relative return motions of the carriages can be as accurately recorded as the forward motions.

I have described my invention as a horizontally operating tearing machine, provided with a measuring spring for recording the tension, but the inventive principle could just as well be applied for a vertical tearing machine in which the tension may be measured by a counter-weight.

Many other modifications are also possible without deviating from the spirit and the leading principles of my invention and its scope and applicability should therefore be judged not so much from the details shown and described but from the claims attached hereafter.

Having now described this novel device according to the patent statutes, what I claim as my invention and desire to protect by Letters Patent, is:—

1. In a testing machine, comprising two gripper carriages adapted to hold and tension a sample of the goods between them, resilient measuring means to hold one of said carriages relatively stationary, the other one being movable and a guiding bed on which the latter member can be slidably moved, the combination with a threaded spindle rotatably attached to the movable gripper carriage, a geared nut stationarily but rotatably seated on the guiding bed adapted to draw in and feed said spindle in either direction when rotated, mechanical means to rotate said nut, a ribbed shaft, running parallel to the spindle and journalled rotatably, but stationarily in an axial direction, and gearing means, operatively connected with the spindle and the shaft respectively and adapted to actuate both in unison; of adjustable means to optionally rotate said spindle and shaft cooperatively or prevent them from rotating, such optionally adjustable means resulting in a difference in speed at which the spindle is drawn in and fed by the rotatable nut.

2. In a testing machine, comprising two gripper carriages adapted to hold and tension a sample of the goods between them, one of them held substantially stationary, the other one being movable, and a guiding bed on which the latter member can be slidably moved, the combination with a threaded spindle rotatably attached to the movable gripper carriage, a geared nut, stationarily but rotatably seated on the guiding bed, adapted to draw in and feed said spindle in either direction when rotated, mechanical means to rotate said nut, a ribbed shaft, running parallel to the spindle and journalled rotatably but stationarily in an axial direction, and gearing means, operatively connected with the spindle and the shaft respectively and adapted to actuate both in unison; of adjustable means to optionally rotate said spindle and shaft cooperatively or prevent them from rotating, such optionally adjustable means resulting in a difference in speed at which the spindle is drawn in and fed by the rotatable nut.

3. A testing machine according to claim 1, characterized by the feature that the adjustable means to optionally rotate or arrest the rotation of the spindle and the shaft, comprise gearing means, adapted to optionally engage and disengage the geared nut, so as to stop and to start the rotation of both, spindle and shaft.

4. A testing machine according to claim 1, characterized by the feature that the adjustable means to optionally rotate or arrest the rotation of the spindle and the shaft comprise gearing means, adapted to optionally engage and disengage the geared nut, so as to stop and to start the rotation of both, spindle and shaft, and means to fixedly hold the spindle and shaft at rest, when said gearing means are disengaged.

5. The combination with a device according to claim 1; of an elongation-recording device, comprising two carriages, arranged on a runway parallel to the guiding bed of the gripper carriages, and provided with two substantially parallel arms, swingable laterally within a limited range, said arms adapted to keep in touch with the sample of goods to be tested at a predetermined initial gauge length.

6. The combination with a device according to claim 1; of an elongation-recording device, comprising two carriages, arranged on a runway parallel to the guiding bed of the gripper carriages, and provided with two substantially parallel arms, swingable laterally within a limited range, said arms adapted to keep in touch with the sample of goods to be tested at a predetermined initial gauge length, and means to transport the carriages along the runway at the same speed at which the contact points of the arms with the sample of goods are travelling.

7. The combination with a device according to claim 1; of an elongation-recording device, comprising two carriages, arranged on a runway parallel to the guiding bed of the gripper carriages, and provided with two substantially parallel arms, swingable laterally within a limited range, said arms adapted to keep in touch with the sample of goods to be tested at a predetermined initial gauge length, and means to transport the carriages along the runway at the same speed at which the contact points of the arms with the sample of goods are travelling, said means comprising electrical contacts on both outer sides of the arms to activate the drive of the carriages according to the lateral swing of said arms.

8. The combination with a testing machine, according to claim 1; of a recording device to record the elongation of the goods under test and independent power means to actuate said recording device, said recording device comprising two carriages, arranged on a runway parallel to the guiding bed of the gripper carriages, driving means to propel said recording carriages at the same speed respectively at which the two ends of the section of the piece under test are moving, grooved disks rotatably arranged one on each of said recording carriages, and a cord, adapted to frictionally rotate the drum of the recording device, said cord being wound about said rotatable grooved disk of the quicker moving carriage and fastened with several yielding turns about said grooved disk on the slower moving carriage, so that the yield and intake of the cord will correspond to the travel of the carriages, and mechanical means to rewind the spent cord, when the carriages are receding.

9. The combination with a device according to claim 1; of an elongation-recording device, comprising two carriages, arranged on a runway parallel to the guiding bed of the gripper carriages, and provided with two substantially parallel arms, swingable laterally within a limited range, said arms adapted to keep in touch with the sample of goods to be tested at a predetermined initial gauge length, and means to transport the carriages along the runway at the same speed at which the contact points of the arms with the sample of goods are travelling, said means comprising electrical contacts on the right hand outer sides of the arms to activate the forward drive of the carriages and similar contacts on the left hand sides to activate the return drive of the carriages when the lateral swing of the arms closes the contact.

10. The combination with a device according to claim 1; of an elongation-recording device, comprising two carriages, arranged on a runway parallel to the guiding bed of the gripper carriages, and provided with two substantially parallel arms, swingable laterally and vertically upwards, said arms adapted to keep in touch with the sample of goods to be tested at a predetermined initial gauge length, means to transport the carriages along the runway at the same speed at which the contact points of the arms with the sample of goods are travelling, said means comprising electrical contacts on the right hand outer sides of the arms to activate the forward drive of the carriages and similar contacts on the left hand sides to activate the return drive when the lateral swing of the arms closes the contact, and mechanical means to effect a left handed contact with subsequent return drive activation whenever the arms are swung vertically upwards.

11. The combination with a device according to claim 1; of an elongation-recording device, comprising two carriages, arranged on a runway parallel to the guiding bed of the gripper carriages, and provided with two substantially parallel arms, swingable laterally within a limited range, said arms adapted to keep in touch with the sample of goods to be tested at a predetermined initial gauge length and provided with two oppositely arranged buffers between them to determine the length at which the sample of goods is to be tested.

12. In a testing machine, comprising two gripper carriages adapted to hold and tension a sample of the goods between them, resilient measuring means to hold one of said carriages relatively stationary, the other one being movable, and a guiding bed on which the latter member can be slidably moved, the combination with a threaded spindle rotatably attached to the movable gripper carriage, a geared nut, stationarily but rotatably seated on the guiding bed, adapted to draw in and feed said spindle in either direction when rotated, mechanical means to rotate said nut, a ribbed shaft, running parallel to the spindle journalled rotatably, but stationarily in an axial direction, and spindle and shaft gearing means coupled to said nut and adapted to actuate said spindle an shaft in unison; of means to uncouple said spindle and shaft gearing means from the nut in such a way that both may be rotated manually to adjust the movable gripper carriage to the proper gauge length of the goods to be tested.

13. In a machine of the character described, means to support and to deform a piece of material for testing purposes, contacting elements for the material, a movable support for each element and means to pivot each element in its support, said elements being adapted to abut on the material at right angles to the direction of elongation substantially free of pressures to prevent distortion and displacement of the material by said elements, means to move each support with its pivoted element during the process of elongation a distance which is determined by the length of motion of each deforming portion of the material which is in contact with a contacting element, a registering device and further means to transmit the length of movement of said supports to said registering device.

14. In a machine of the character described, means to support and to deform a piece of material for testing purposes, contacting elements for the material, a movable support for each element and means to pivot each element in its support, said elements being adapted to abut on the material at an angle to the direction of elongation substantially free of pressures to prevent distortion and displacement of the material by said elements, said contacting elements being further adapted to contact the material at substantially any location within its surface length, means to move each support with its pivoted element during the process of elongation a distance which is determined by the length of motion of each deforming portion of the material which is touched by a contacting element, a registering device and further means adapted to transmit the length of movement of said supports to said registering device.

STEPHEN ZECHMEISTER.